(12) United States Patent
Chen et al.

(10) Patent No.: US 6,623,125 B2
(45) Date of Patent: Sep. 23, 2003

(54) HEAT-DISSIPATING DEVICE FOR LIQUID CRYSTAL DISPLAY PROJECTOR

(75) Inventors: Hsi-Chao Chen, Taoyuan Shien (TW); Tom Haven, Beaverton, OR (US)

(73) Assignee: Delta Electronics, Inc. (TW)

( * ) Notice: Subject to any disclaimer, the term of this patent is extended or adjusted under 35 U.S.C. 154(b) by 0 days.

(21) Appl. No.: 09/801,018

(22) Filed: Mar. 7, 2001

(65) Prior Publication Data

US 2002/0171812 A1 Nov. 21, 2002

(51) Int. Cl.[7] .................. G03B 21/16; G03B 21/18; G03B 21/14
(52) U.S. Cl. .............. 353/52; 353/20; 353/58; 353/60; 353/61
(58) Field of Search ............... 353/52, 57, 58, 353/20, 60, 61

(56) References Cited

U.S. PATENT DOCUMENTS

| | | | | |
|---|---|---|---|---|
| 5,682,216 A | * | 10/1997 | Lin et al. ................ | 349/122 |
| 6,132,049 A | * | 10/2000 | Yamaguchi et al. ........ | 353/61 |
| 6,280,038 B1 | * | 8/2001 | Fuse et al. ................ | 353/57 |
| 6,290,360 B1 | * | 9/2001 | Konuma et al. ........... | 353/61 |
| 6,334,686 B1 | * | 1/2002 | Shiraishi et al. .......... | 353/57 |

\* cited by examiner

*Primary Examiner*—Russell Adams
*Assistant Examiner*—Magda Cruz
(74) *Attorney, Agent, or Firm*—Mathews, Collins, Shepherd & McKay, P.A.

(57) ABSTRACT

A heat-dissipating device for being used in a liquid crystal display projector having liquid crystal displays and polarizers is provided. The heat-dissipating device includes a heat-dissipating channel disposed under the liquid crystal displays and the polarizers and having a main path, a first branch, a second branch, and a plurality of vents corresponding to and adjacent to the liquid crystal displays and the polarizers, respectively, and a fan connected with an end of the heat-dissipating channel, wherein when an airflow is blown from the fan into the main path, the first branch and the second branch and discharged outwardly through the vents, heat generated from the liquid crystal displays and the polarizers is dissipated and temperatures around the liquid crystal displays are kept near isothermal.

9 Claims, 6 Drawing Sheets

HEAT-DISSIPATING DEVICE FOR LIQUID CRYSTAL DISPLAY PROJECTOR

FIELD OF THE INVENTION

The present invention relates to a heat-dissipating device, and more particularly to a heat-dissipating device for being used in a liquid crystal display projector.

BACKGROUND OF THE INVENTION

Please refer to FIG. 1. FIG. 1 is a schematic view showing the components of a liquid crystal display projector (LCD projector). Three liquid crystal displays are comprised in the LCD projector for respectively presenting red, blue and green colors to project image. A polychromatic light from a light source 1 passes through a light integrator 3 to provide a parallel beam to a condensing lens 4. The beam condensed from the condensing lens 4 is separated into blue, green and red light by a first dichroic mirror 5 and a second dichroic mirror 6. The red light is reflected by a first reflecting mirror 17 to a relay lens 21. The red light passed from the delay lens 21 passes through a second reflecting mirror 18 to a red-light modulating LCD 7.

The blue light is reflected to a lens 15 by a third reflecting lens 14. The blue light is modulated as a parallel beam by the lens 15. The blue light passed from the lens 15 is projected to a blue-light modulating LCD 9. The green light is modulated as a parallel beam by a lens 16. The green light passed from the lens 16 is projected onto a green-light modulating LCD 8.

In addition, a first polarizer 170, a second polarizer 160 and a third polarizer 150 are disposed adjacent to the red-light modulating LCD 7, the green-light modulating LCD 8 and the blue-light modulating LCD 9, respectively. The polarizers are used for polarizing each of the red, green and blue light as a P-polarized light or an S-polarized light.

The red light comes into the red-light modulating LCD 7 through the first polarizer 170. The green light comes into the green-light modulating LCD 8 through the second polarizer 160. The blue light comes into the blue-light modulating LCD 9 through the third polarizer 150.

The red, green and blue light respectively modulated by the red-light modulating LCD 7, the green-light modulating LCD 8 and the blue-light modulating LCD 9 is synthesized by a trichroic prism 10. The beam synthesized by the trichroic prism is projected onto a screen by a projection lens 11.

When the incident light is transmitted through the polarizers, the temperatures of the first polarizer 170, the second polarizer 160 and the third polarizer 150 are increased due to the S-polarized or P-polarized light. Furthermore, the temperatures of the red-light modulating LCD 7, the green-light modulating LCD 8 and the blue-light modulating LCD 9 are also increased due to the S-polarized or P-polarized light.

However, the energy of different monochromic light is different. The formula of a monochromic light energy is $e = h \times v$, wherein $h = 6.626176 \times 10^{-34}$ joule/sec and $v$ is the frequency of the monochromic light. Hence, because the energy absorbed by each modulating LCD is different, the temperatures of the red-light modulating LCD 7, the green-light modulating LCD 8 and the blue-light modulating LCD 9 are different.

Generally, the limiting operation temperature of the LCD is about 60° C. and the limiting operation temperature of the polarizer is about 80° C. In addition, the difference between the temperatures of the red-light modulating LCD 7, the green-light modulating LCD 8 and the blue-light modulating LCD 9 would decrease the quality of the projected image and even cause failure of the LCD.

Please refer to FIG. 2. FIG. 2 is a schematic view showing a liquid crystal display projector having a heat-dissipating device according to the prior art. The heat generated from a the red-light modulating LCD 7, a green-light modulating LCD 8 and a blue-light modulating LCD 9 is dissipated by a fan 11. The fan 11 is an axial fan disposed under a prism 10, the red-light modulating LCD 7, the green-light modulating LCD 8 and the blue-light modulating LCD 9.

TABLE 1

| Type of fan | a | b | c |
| --- | --- | --- | --- |
| Axial fan | 39° C. | 49° C. | 52° C. |
| Blast blower | 38.5° C. | 45.7° C. | 48° C. | a: red-light modulating LCD
b: green-light modulating LCD
c: blue-light modulating LCD Please refer to Table 1. The temperature of each LCD comprised in the LCD projectors having different type of fans is measured and shown in Table 1. The airflow is blown straightly from the axial fan disposed under the red-light modulating LCD, the green-light modulating LCD and the blue-light modulating LCD, and leads to great difference between the temperatures of the LCDs. Thus, the color of the projected image is diverged from normal, and the quality of the projected image is decreased.

Please refer to FIG. 3 and Table 1. The heat generated from a LCD 7, a LCD 8, a LCD 9 and polarizers 10 is dissipated by a blast blower 80 through a channel 82. The channel 82 is in rectangular shape. When the blast blower 80 is activated, the heat generated from the LCD 7, the LCD 8, the LCD 9 and polarizers 10 is dissipated by the airflow through the channel 82. However, the temperatures of the LCD 7, the LCD 8 and the LCD 9 are not uniform. Furthermore, the difference between the temperatures of the LCD 7, the LCD 8 and the LCD 9 is greater than 5° C. Hence, the manner of using a blast blower sidewardly connected with a rectangular-shaped channel to dissipate the heat should be improved.

In order to overcome the foresaid problems, the present invention provide a heat-dissipating device for a LCD projector.

SUMMARY OF THE INVENTION

It is an object of the present to provide a heat-dissipating device for being used in a liquid crystal display projector having liquid crystal displays and polarizers.

In accordance with the present invention, the heat-dissipating device includes a heat-dissipating channel and a fan.

The heat-dissipating channel is disposed under the liquid crystal displays and the polarizers and includes a main path, a first branch, a second branch, and a plurality of vents corresponding to and adjacent to the liquid crystal displays and the polarizers, respectively.

The fan is connected with an end of the heat-dissipating channel

When an airflow is blown from the fan into the main path, the first branch and the second branch and discharged outwardly through the vents, heat generated from the liquid crystal displays and the polarizers is dissipated and temperatures around the liquid crystal displays are kept near isothermal.

Preferably, the first branch and the second branch are bilaterally connected with the main path. The heat-dissipating channel is about Y-shaped.

In addition, the heat-dissipating device further includes a first regulation plate disposed at a first entrance of the first branch for regulating a first width of the first entrance to limit relative spaces of the first branch, the second branch and the main path.

Furthermore, the heat-dissipating device includes a second regulation plate disposed at a second entrance of the second branch for regulating a second width of the second entrance to limit relative spaces of the first branch, the second branch and the main path.

Preferably, the number of the liquid crystal displays is three and the number of the plurality of vents is three.

Preferably, two vents and two liquid crystal displays are positioned on the first branch, and the other vent and the other liquid crystal display are positioned on the second branch.

Preferably, two vents and two liquid crystal displays are positioned on the second branch, and the other vent and the other liquid crystal display are positioned on the first branch.

Preferably, the fan is a blast blower and sidewardly connected with the heat-dissipating device. The liquid crystal displays are arranged in V-shape.

It is another object of the present invention to provide a liquid crystal display projector.

In accordance with the present invention, the liquid crystal display projector includes three polarizers, three liquid crystal displays, a heat-dissipating channel and a fan.

The three polarizers are used for polarizing red, green, and blue light, respectively.

The three liquid crystal displays are used for modulating the polarized red, green and blue light, respectively.

The heat-dissipating channel is disposed under the three liquid crystal displays and the three polarizers and includes a main path, a first branch, a second branch and three vents corresponding to and adjacent to the three liquid crystal displays and the three polarizers.

The fan is connected with an end of the heat-dissipating channel.

When an airflow is blown from the fan into the main path, the first branch and second branch and discharged outwardly through the three vents, heat generated from the three liquid crystal displays and the three polarizers is dissipated and temperatures around the three liquid crystal displays are kept near isothermal.

In addition, the first branch and the second branch are bilaterally connected with the main path.

The liquid crystal projector further includes a regulation plate disposed at a entrance of the first branch for regulating a width of the entrance to limit relative spaces of the first branch, the second branch and main path.

Two of the three vents and two of the three liquid crystal displays are positioned on the first branch, and the other vent and liquid crystal display are positioned on the second branch.

Preferably, the liquid crystal displays are arranged in V-shape.

It is another object of the present invention to provide a heat-dissipating channel for being used in connecting with a fan and directing an airflow blown from the fan.

In accordance with the present invention, the heat-dissipating channel includes a main path, a first branch connected with a first side of the main path, a second branch connected with a second side of the main path, and a regulation plate disposed at a entrance of the first branch for regulating a width of the first entrance to limit relative spaces of the first branch, the second branch and the main path.

Preferably, the heat-dissipating channel is about Y-shaped.

It is another object of the present invention to provide a heat-dissipating device for being used in a liquid crystal display projector having liquid crystal displays and polarizers.

The heat-dissipating device includes a heat dissipating channel and a fan.

The heat-dissipating channel is disposed under the liquid crystal displays and the polarizers and includes a main path, a first branch, a second branch, and a plurality of vents corresponding to and adjacent to the liquid crystal displays and the polarizers, respectively.

The fan is connected with an end of the heat-dissipating channel.

When an airflow is blown from the vents into the first branch, the second branch and the main path and discharged outwardly through the fan, heat generated from the liquid crystal displays and the polarizers is dissipated and temperatures around the liquid crystal displays are kept near isothermal.

The present invention may best be understood through the following descriptions with reference to the accompanying drawings, in which:

DETAILED DESCRIPTION OF THE PREFERRED EMBODIMENTS

Figure 1:
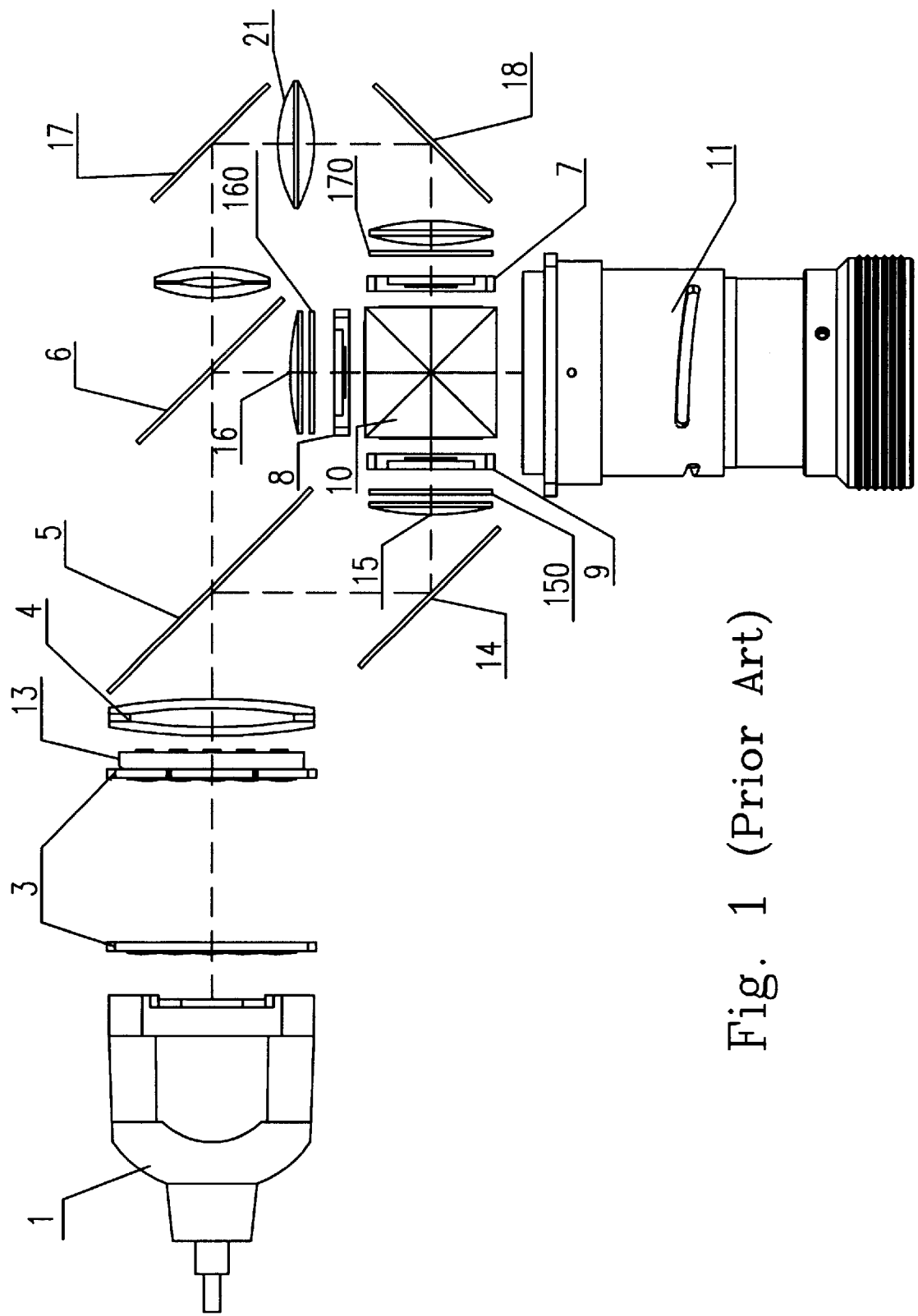
FIG. 1 is a schematic view showing the components of a liquid crystal display projector according to the prior art.
Figure 2:
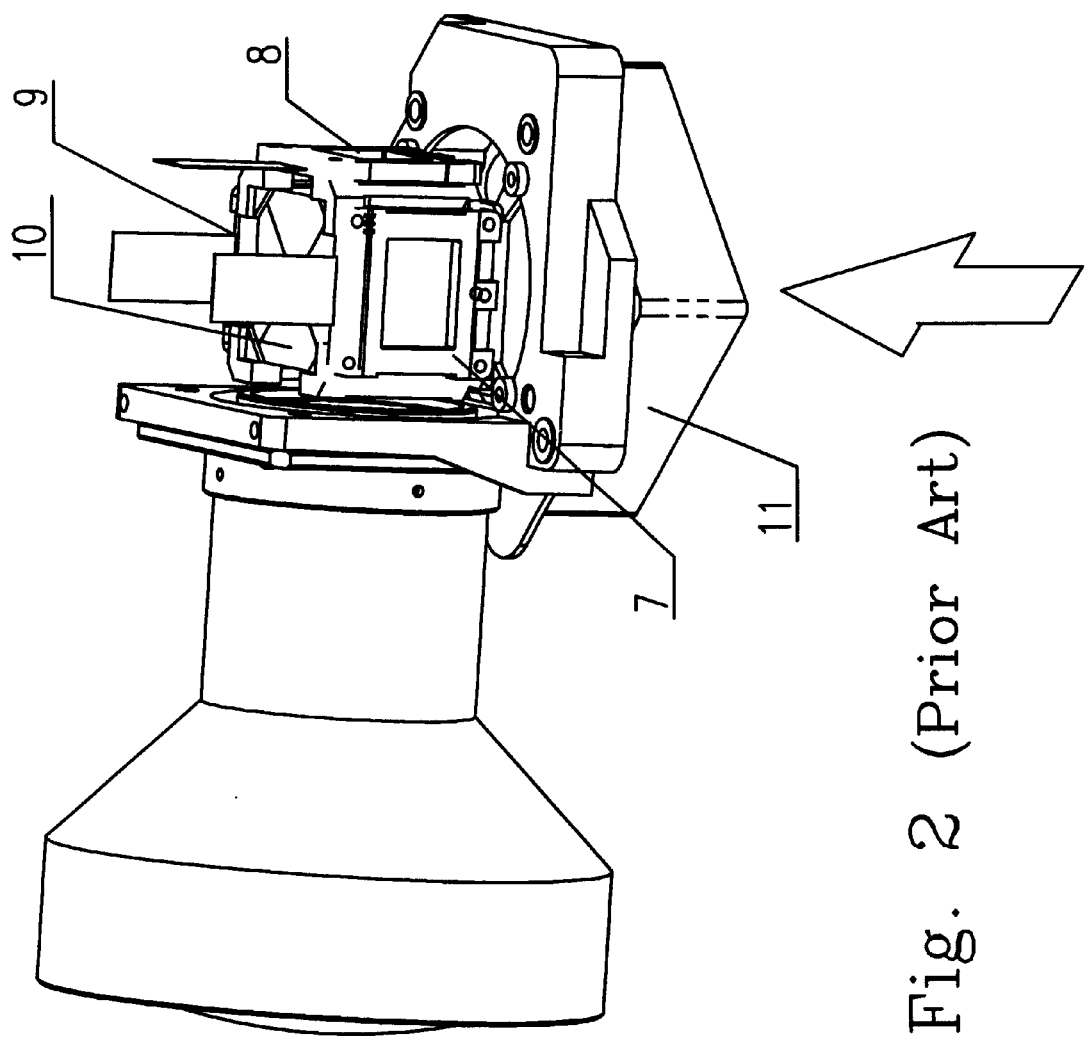
FIG. 2 is a schematic view showing a liquid crystal display projector having a axial fan according to the prior art.
Figure 3:
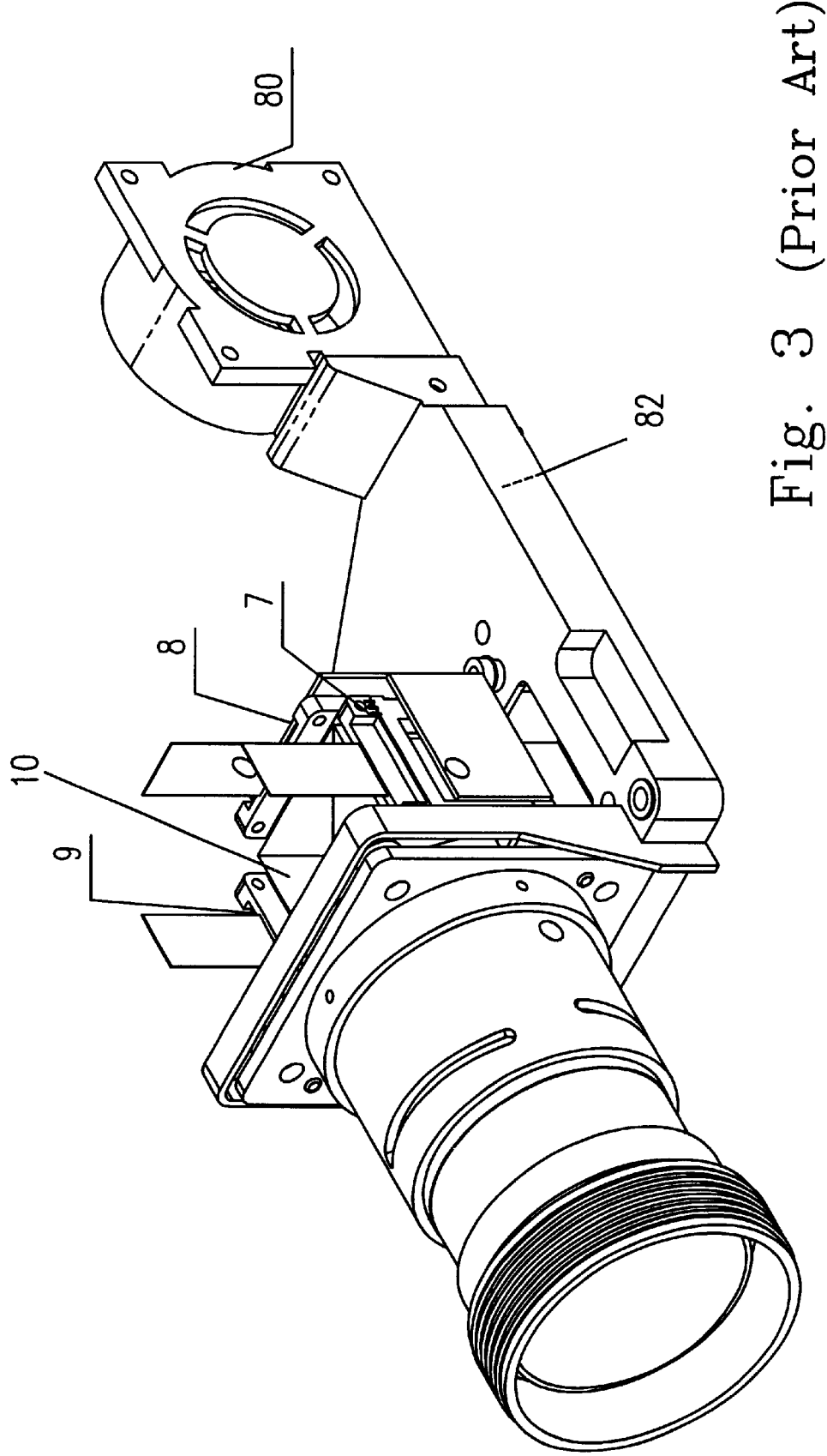
FIG. 3 is a schematic view showing a liquid crystal display projector having a blast blower according to the prior art.
Figure 4:
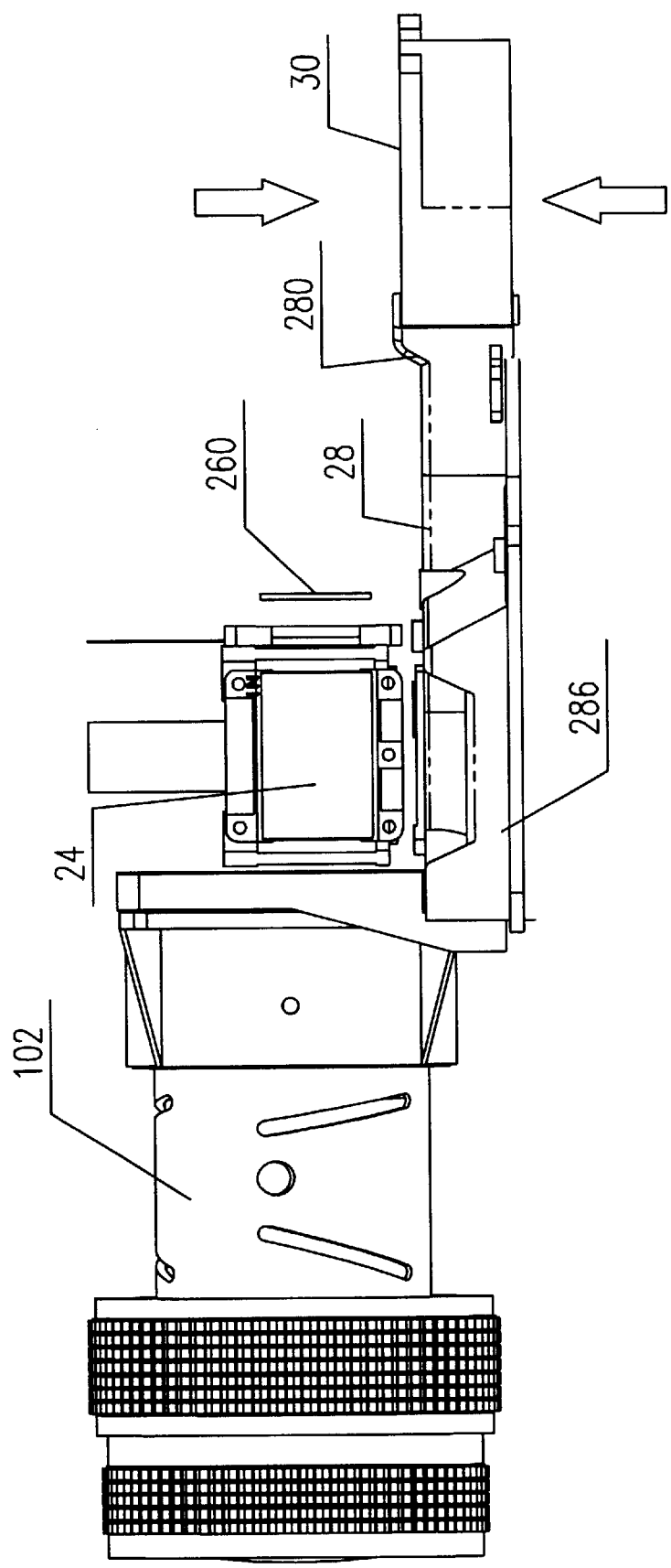
FIG. 4 is a side view showing the heat-dissipating device according to the preferred embodiment of the present invention.
Figure 5:
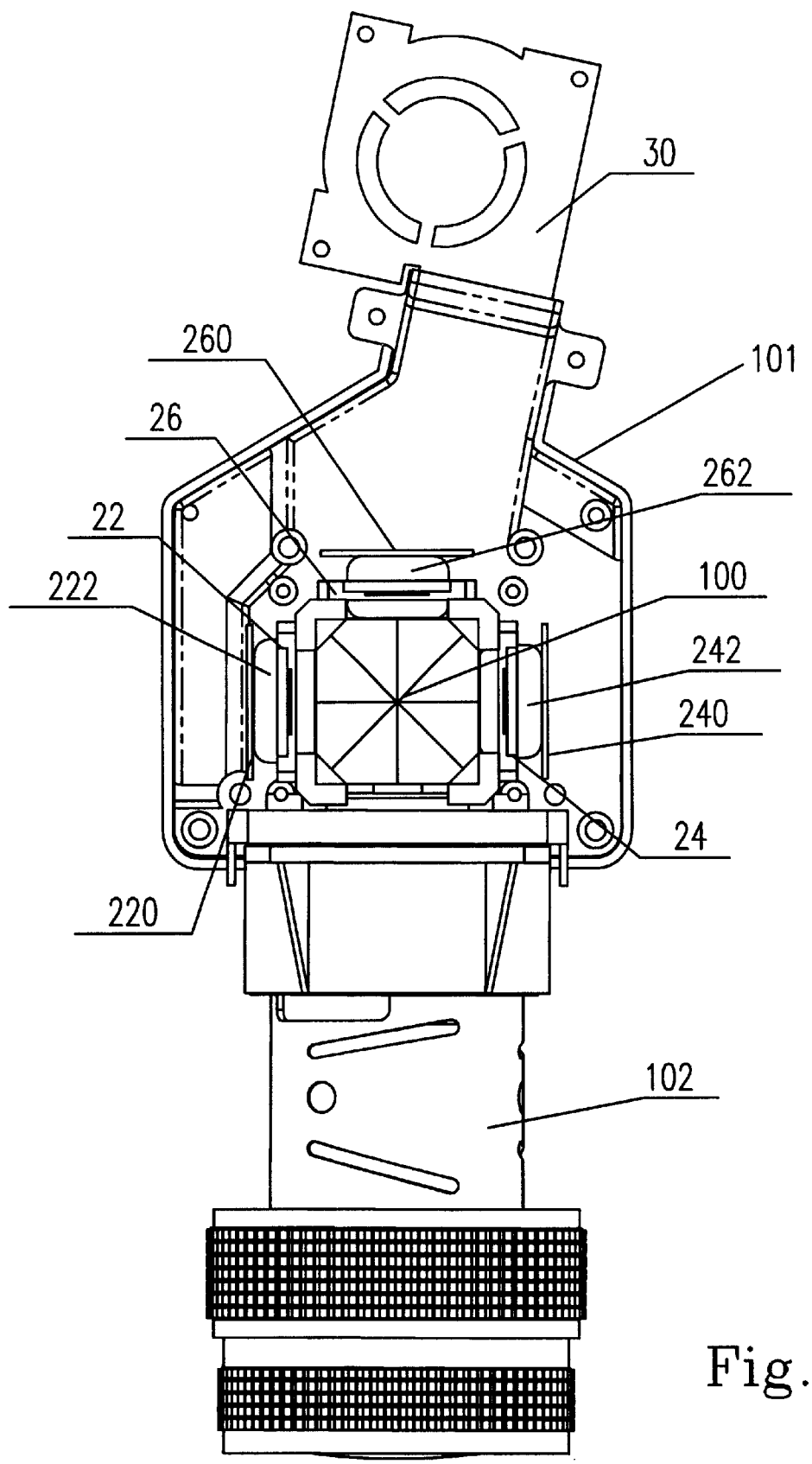
FIG. 5 is a top view showing the heat-dissipating device according to the preferred embodiment of the present invention.

Please refer to FIGS. 4 and 5. A heat-dissipating channel 28 is disposed under a red-light modulating LCD 22, a blue-light modulating LCD 24 and a green-light modulating LCD 26. A prism 100 is disposed between the red-light modulating LCD 22, the blue-light modulating LCD 24 and the green-light modulating LCD 26, wherein the prism 100 is at the right side of the red-light modulating LCD 22, at the left side of the blue-light modulating LCD 24 and at a side of the green-light modulating LCD 26 facing a projection lens 102.

A red-light polarizer 220 is disposed outside the red-light modulating LCD 22 in a specific distance. A blue-light polarizer 240 is disposed outside the blue-light modulating LCD 24 in a specific distance. A green-light polarizer 260 is disposed outside the green-light modulating LCD 26 in a specific distance.

A vent 222 adjacent to LCD 22 is positioned between the red-light modulating LCD 22, the red-light polarizer 220 and the heat-dissipating channel 28. A vent 242 adjacent to LCD 22 is positioned between the blue-light modulating LCD 24, the blue-light polarizer 240 and the heat-dissipating channel 28. A vent 262 adjacent to LCD 26 is positioned between the green-light modulating LCD 26, the green-light polarizer 260 and the heat-dissipating channel 28.

An opening portion 280 is positioned at an end of the heat-dissipating channel 28 and connected with a fan 30. Preferably, the fan 30 could be a blast blower.

Figure 6:
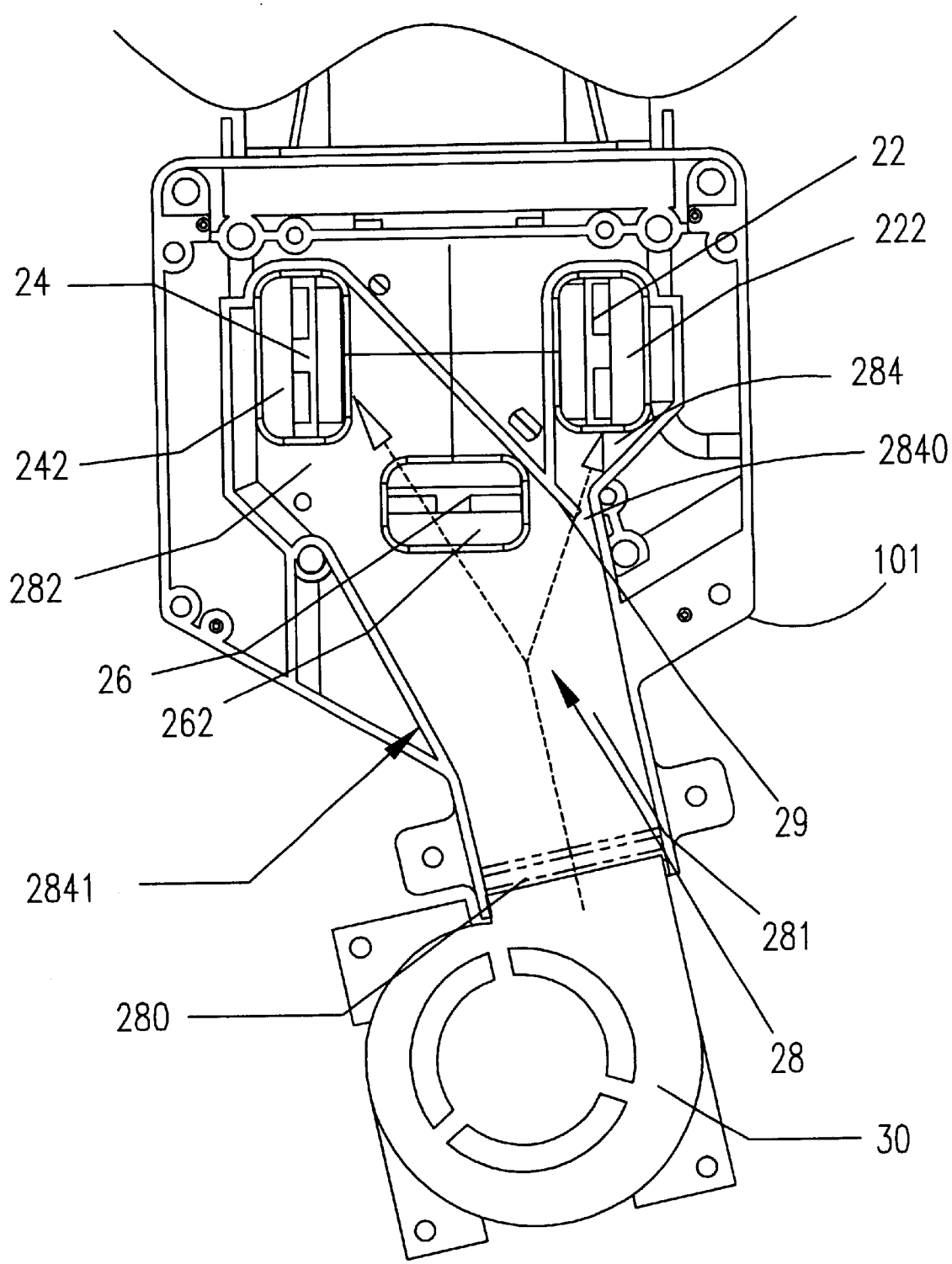
FIG. 6 is bottom view showing the heat-dissipating device according to the preferred embodiment of the present invention.

Please refer to FIG. 6. The heat-dissipating channel 28 is constructed by a projector casing 101, a peripheral portion 2841 and a bottom casing 286 (shown in FIG. 5). The inner part of the heat-dissipating channel 28 is about Y-shaped. The heat-dissipating channel 28 includes a main path 281, a first branch 282 and a second branch 284. The other end of the main path is connected with the first branch 282 and the second branch 284.

The vent 242 adjacent to LCD 24 and the vent 262 adjacent to LCD 26 are positioned on the projector casing 101 corresponding to the first branch 282. The vent 222 adjacent to LCD 22 is positioned on the projector casing 101 corresponding to the second branch 284.

The blue-light modulating LCD 24 and the green-light modulating LCD 26 are positioned in the first branch 282, and the red-light modulating LCD 22 is positioned in the second branch 284. The three LCDs are arranged in U-shape, and the opening of the V-shape is at the side near the projection lens 102.

The airflow blown from the fan 30 is directed to the blue-light modulating LCD 24 and the green-light modulating LCD 26 by the vent 242 adjacent to LCD 24 and the vent 262 adjacent to LCD 24 through the first branch 282. The airflow blown from the fan 30 is directed to the red-light modulating LCD 22 by the vent 222 adjacent to LCD 22 through the second branch 284.

TABLE 2

|  | a | b | c |
| --- | --- | --- | --- |
| The present invention | 47° C. | 48° C. | 47° C. | a: red-light modulating LCD
b: green-light modulating LCD
c: blue-light modulating LCD The temperature of each LCD comprised in the LCD projector provided by the present invention is measured and shown in Table 2. The LCDs are near isothermal.

The temperatures of the red-light polarizer 220, the blue-light polarizer 240 and the green light polarizer 260 are lowered to the required temperature through the heat-dissipating device provided by the present invention.

The space of the first branch 282 and the second branch 284 is determined by calculating the quantities of the separated airflow which is sufficient to make the blue-light modulating LCD 24, the green-light modulating LCD 26 and the red-light modulating LCD 22 near isothermal.

A regulating plate 29 could be disposed at an entrance 2840 of the second branch 284 for regulating the width of the second branch 284 to limit the relative space of the main path 281, the first branch 282 and the second branch 284. The heat-dissipating effect could be determined by the length of the regulating plate 29.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A heat-dissipating device for being used in a liquid crystal display projector having liquid crystal displays and polarizers, comprising:

a heat-dissipating channel disposed under said liquid crystal displays and said polarizers and comprising a main path, a first branch having a first entrance having a first width, a second branch having a second entrance having a second width, and a plurality of vents corresponding to and adjacent to said liquid crystal displays and said polarizers, respectively;

a first regulation plate disposed at said first entrance for regulating said first width to limit relative spaces of said first branch, said second branch and said main path;

a second regulation plate disposed at said second entrance for regulating said second width to limit relative spaces of said first branch, said second branch and main path; and a fan connected with an end of said heat-dissipating channel, wherein when an airflow is blown from said fan into said main path, said first branch and said second branch and discharged outwardly through said vents, heat generated from said liquid crystal displays and said polarizers is dissipated and temperatures around said liquid crystal displays are kept near isothermal, and wherein the space of said first branch and said second branch is determined by calculating quantities of two separated airflows of said air flow, which are sufficient to make said liquid crystal displays near isothermal.

2. The heat-dissipating device according to claim 1, wherein said first branch and said second branch are bilaterally connected with said main path.

3. The heat-dissipating device according to claim 1, wherein said heat-dissipating channel is approximately Y-shaped.

4. The heat-dissipating device according to claim 1, wherein the number of said liquid crystal displays is three and the number of said plurality of vents is three.

5. The heat-dissipating device according to claim 4, wherein two vents and two liquid crystal displays are positioned on said first branch, and the other vent and the other liquid crystal display are positioned on said second branch.

6. The heat-dissipating device according to claim 4, wherein two vents and two liquid crystal displays are positioned on said second branch, and the other vent and liquid crystal display are positioned on said first branch.

7. The heat-dissipating device according to claim 1, wherein said fan is a blast blower.

8. The heat-dissipating device according to claim 7, wherein said blast blower is sidewardly connected with said heat-dissipating device.

9. The heat-dissipating device according to claim 1, wherein said liquid crystal displays are arranged in V-shape.

* * * * *